US011650375B2

(12) United States Patent
Uehara et al.

(10) Patent No.: US 11,650,375 B2
(45) Date of Patent: May 16, 2023

(54) FERRULE AND OPTICAL CONNECTOR

(71) Applicant: SUMITOMO ELECTRIC INDUSTRIES, LTD., Osaka (JP)

(72) Inventors: Fumiya Uehara, Osaka (JP); Masaki Omura, Osaka (JP); Takayuki Shimazu, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 184 days.

(21) Appl. No.: 17/420,018

(22) PCT Filed: Jan. 24, 2020

(86) PCT No.: PCT/JP2020/002565
§ 371 (c)(1),
(2) Date: Jun. 30, 2021

(87) PCT Pub. No.: WO2020/162230
PCT Pub. Date: Aug. 13, 2020

(65) Prior Publication Data
US 2022/0120978 A1    Apr. 21, 2022

(30) Foreign Application Priority Data
Feb. 4, 2019    (JP) .............................. JP2019-017681

(51) Int. Cl.
*G02B 6/38*    (2006.01)
*G02B 6/36*    (2006.01)
(52) U.S. Cl.
CPC ......... *G02B 6/3839* (2013.01); *G02B 6/3644* (2013.01); *G02B 6/3834* (2013.01); *G02B 6/3885* (2013.01)
(58) Field of Classification Search
CPC .. G02B 6/3839; G02B 6/3644; G02B 6/3885; G02B 6/3834
See application file for complete search history.

(56) References Cited

U.S. PATENT DOCUMENTS 5,975,770 A    11/1999  Yanagi et al.
7,261,469 B1 *  8/2007  Dean, Jr. .............. G02B 6/3882
                                                425/468
(Continued)

FOREIGN PATENT DOCUMENTS

CN    102171594 A    8/2011
CN    104880777 A    9/2015
(Continued)

OTHER PUBLICATIONS

Mar. 24, 2020 International Search Report issued in International Patent Application No. PCT/JP2020/002565.

*Primary Examiner* — Ryan A Lepisto
*Assistant Examiner* — Erin D Chiem
(74) *Attorney, Agent, or Firm* — Oliff PLC

(57) ABSTRACT

A ferrule for retaining a plurality of optical fibers includes a front end surface; a rear end surface; a plurality of fiber retaining holes; an accommodation hole; and a void portion. The fiber retaining holes each extend from the front end surface toward the rear end surface along a first direction. The accommodation hole is connected to the plurality of fiber retaining holes. The void portion is provided in a region around the plurality of fiber retaining holes. The fiber retaining holes include constant diameter portions extending from the front end surface along the first direction. The void portion is provided along the constant diameter portions, and is aligned with the constant diameter portions in a plane perpendicular to the first direction. A minimum value of a width in the plane of the void portion differs from an inner diameter of the constant diameter portion.

14 Claims, 12 Drawing Sheets

(56) References Cited

U.S. PATENT DOCUMENTS

| | | | | |
|---|---|---|---|---|
| 8,891,926 B2 * | 11/2014 | DeMeritt | ............. | G02B 6/4404 |
| | | | | 385/134 |
| 2011/0176766 A1 | 7/2011 | Tanaka et al. | | |
| 2015/0247983 A1 | 9/2015 | Ohmura et al. | | |
| 2016/0054523 A1 | 2/2016 | Lu | | |

FOREIGN PATENT DOCUMENTS

| JP | H07-056054 A | 3/1995 |
|---|---|---|
| JP | H10-010368 A | 1/1998 |
| JP | H11-211934 A | 8/1999 |
| JP | 2004-037844 A | 2/2004 |
| JP | 2004-170671 A | 6/2004 |
| JP | 2011-022248 A | 2/2011 |
| JP | 2017-227815 A | 12/2017 |

* cited by examiner

FERRULE AND OPTICAL CONNECTOR

TECHNICAL FIELD

The present disclosure relates to a ferrule and an optical connector.

This application is based on and claims benefits of priority to Japanese Patent Application No. 2019-017681 filed on Feb. 4, 2019, the entire content of which is incorporated herein by reference.

BACKGROUND ART

Patent Literature 1 and Patent Literature 2 disclose multi-core ferrules. The ferrule described in Patent Literature 1 is molded by using a mold including a plurality of insertion hole forming pins for respectively forming a plurality of fiber insertion holes. In the mold, pin rows in each of which the plurality of insertion hole forming pins are arranged in one row are disposed in two stages, and a regulator having a plate shape is disposed between the pin rows. In a state where the regulator is disposed in such a manner, a resin is injected into the mold, so that deflection or bending of each of the insertion hole forming pins during molding is regulated. The regulator is embedded in the resin forming the ferrule.

The ferrule described in Patent Literature 2 includes a fiber hole which extends rearward from a front end surface of the ferrule and into which a glass portion of an optical fiber is inserted; a terminal hole which extends further rearward from the fiber hole and into which a coated portion of the optical fiber is inserted; and a window for injecting an adhesive agent. The ferrule is molded by using a mold including a lower mold, a middle mold, and an upper mold. The upper mold and the lower mold interpose the middle mold therebetween, and form a cavity including an internal space into which a molten resin is introduced. The lower mold includes a window piece for forming the window of the ferrule. The middle mold includes a terminal forming tool that has a square thick plate shape and is for forming the terminal hole, and a fiber hole pin for forming the fiber hole. The terminal forming tool retains a rear portion of a base portion of the fiber hole pin. A tip portion of the terminal forming tool extends forward to form a gap between the tip portion and a front portion of the base portion of the fiber hole pin, and is in contact with the window piece of the lower mold. When the ferrule is molded in a state where the gap is formed in such a manner, a projecting portion having a thin plate shape is formed at the position of the gap. The projecting portion is cut with a tool before the ferrule is used.

CITATION LIST

Patent Literature

Patent Literature 1: Japanese Unexamined Patent Publication No. 2004-037844
Patent Literature 2: Japanese Unexamined Patent Publication No. H07-056054

SUMMARY OF INVENTION

The present disclosure provides a ferrule for retaining a plurality of optical fibers. The ferrule includes a front end surface; a rear end surface located on opposite to the front end surface in a first direction; a plurality of fiber retaining holes; an accommodation hole; and a void portion. The plurality of fiber retaining holes each extend from the front end surface toward the rear end surface along the first direction, and are disposed along a second direction intersecting the first direction. The accommodation hole is connected to the plurality of fiber retaining holes, and is open in the rear end surface. The void portion is provided in a region around the plurality of fiber retaining holes. The fiber retaining holes include constant diameter portions extending from the front end surface along the first direction. The void portion is provided along the constant diameter portions, and is formed to be aligned with the constant diameter portions in a plane perpendicular to the first direction. A minimum value of a width in the plane of the void portion differs from an inner diameter of the constant diameter portion.

The present disclosure provides an optical connector. The optical connector includes the above ferrule and a plurality of optical fibers that are retained by the plurality of fiber retaining holes, respectively.

DESCRIPTION OF EMBODIMENTS

Figure 1:
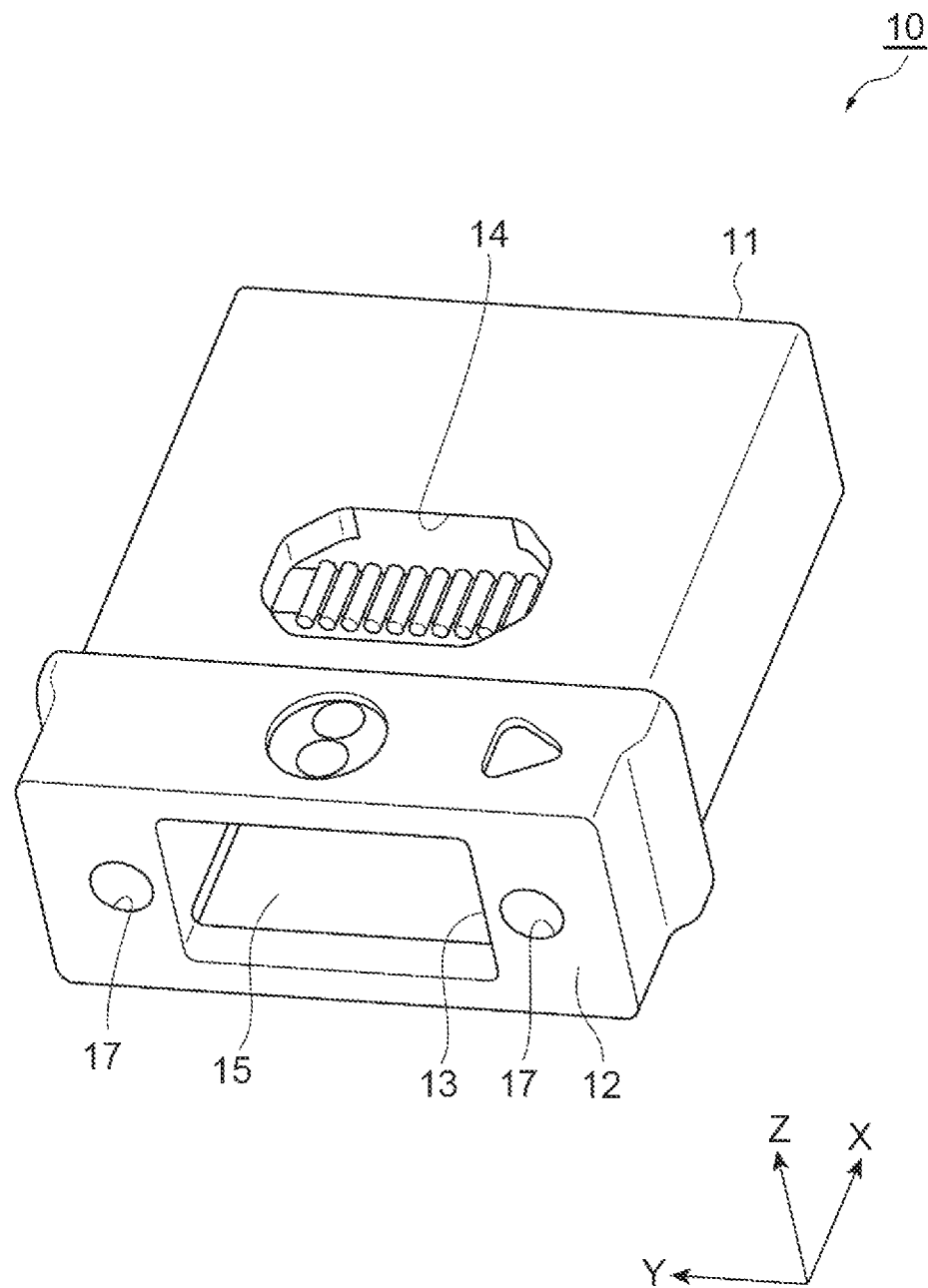
FIG. 1 is a perspective view illustrating a ferrule according to one embodiment.

Problem to be Solved by Present Disclosure

When a ferrule is molded by using a mold including a plurality of pins for forming a plurality of fiber retaining holes, bending may occur in the pins of the mold due to shrinkage of a resin, and bending may occur in each of the fiber retaining holes of the ferrule accordingly in a step of solidifying the resin. If the bending occurs, when a front end surface of the ferrule is polished, the opening position of each of the fiber retaining holes in the front end surface is shifted by polishing. The shift in opening position causes the positional shift of each of optical fibers in the front end surface, which can lead to an increase in loss of connection between optical connectors.

In the ferrule described in Patent Literature 1, the regulator disposed between the pin rows is used to regulate the bending of each of the insertion hole forming pins during molding in order to suppress the occurrence of bending in each of the fiber retaining holes. However, in this ferrule, it is required to separately prepare such a regulator that can lead to an increase in production cost. Further, since the regulator is embedded in the resin of the ferrule, in a case where the coefficient of linear expansion of the regulator differs from the coefficient of linear expansion of the resin of the ferrule, the reliability (for example, temperature characteristics) of the optical connector may be affected by thermal stress caused by a difference between the coefficient of linear expansion of the regulator and the coefficient of linear expansion of the resin of the ferrule. In the ferrule described in Patent Literature 2, when the optical fibers are inserted into the ferrule, additional work of cutting the projecting portion is required, which can lead to an increase in production man-hours.

Effect of Present Disclosure

According to the present disclosure, while the production cost and the production man-hours are suppressed, a loss of optical connection can be suppressed by suppressing the bending of the fiber retaining holes.

Description of Embodiment of Present Disclosure

Initially, the contents of an embodiment of the present disclosure will be listed and described. A ferrule according to one embodiment is a ferrule for retaining a plurality of optical fibers, and includes: a front end surface; a rear end surface located on opposite to the front end surface in a first direction; a plurality of fiber retaining holes; an accommodation hole; and a void portion. The plurality of fiber retaining holes each extend from the front end surface toward the rear end surface along the first direction, and are disposed along a second direction intersecting the first direction. The accommodation hole is connected to the plurality of fiber retaining holes, and is open in the rear end surface. The void portion is provided in a region around the plurality of fiber retaining holes. The fiber retaining holes include constant diameter portions extending from the front end surface along the first direction. The void portion is provided along the constant diameter portions, and is formed to be aligned with the constant diameter portions in a plane perpendicular to the first direction. A minimum value of a width in the plane of the void portion differs from an inner diameter of the constant diameter portion.

When a ferrule is molded by using a mold including a plurality of retaining hole forming pins for respectively forming a plurality of fiber retaining holes, shrinkage stress caused by shrinkage of a resin is applied in a plane perpendicular to the first direction in a step of solidifying the resin forming the ferrule, so that a constant diameter region of each of the retaining hole forming pins, which corresponds to a constant diameter portion of each of the fiber retaining holes, may be bent in the plane. When bending occurs in the constant diameter portion of each of the fiber retaining holes accordingly, the positional shift of each of optical fibers in a front end surface is caused, which can lead to an increase in loss of connection between optical connectors. On the other hand, in the above ferrule, the void portion is provided in the region around the plurality of fiber retaining holes, and the void portion is provided along the constant diameter portions of the plurality of fiber retaining holes, and is formed to be aligned with the constant diameter portions in the plane. When the ferrule including such a void portion is molded, since void portion forming pins for forming the void portion are disposed in a region around constant diameter regions of a plurality of retaining hole forming pins, the balance of shrinkage stress applied to the region around the constant diameter region of each of the retaining hole forming pins can be improved in a step of solidifying a resin. Accordingly, the shrinkage stress of the resin applied to the constant diameter region of each of the retaining hole forming pins in the plane can be reduced, and the occurrence of bending in the constant diameter region of each of the retaining hole forming pins can be suppressed. Accordingly, the bending of the constant diameter portion of each of the fiber retaining holes can be suppressed, so that the positional shift of each of the optical fibers in the front end surface can be reduced. As a result, an increase in loss of optical connection between optical connectors can be suppressed.

Further, in a case where the minimum value of the width in the plane of the void portion is made different to be larger than the inner diameter of the constant diameter portion of the fiber retaining hole, when the ferrule is molded, the shrinkage stress applied to the constant diameter region of each of the retaining hole forming pins in the plane can be effectively reduced. Therefore, the bending of the constant diameter portion of each of the fiber retaining holes can be effectively suppressed. On the other hand, in a case where the minimum value of the width of the void portion is made different to be smaller than the inner diameter of the constant diameter portion, each of the optical fibers can be prevented from being erroneously inserted into the void portion. Further, according to the above ferrule, it is not required to separately prepare a component for suppressing the bending of the constant diameter portion of each of the fiber retaining holes, and additional work is not required when each of the optical fibers is inserted into the ferrule, so that an increase in production cost and production man-hours can be suppressed. Therefore, according to the above ferrule, while the production cost and the production man-hours are suppressed, a loss of optical connection can be suppressed by suppressing the bending of each of the fiber retaining holes.

In the above ferrule, the void portion may penetrate through the ferrule from the accommodation hole to the front end surface. Accordingly, when the ferrule is molded, tips of the void portion forming pins of the mold can be supported by a mold member disposed outside the front end surface. In this case, as compared to a case where the void portion forming pins are supported in a cantilever manner without the tips of the void portion forming pins being supported by the mold member, the turbulence of the flow of the resin injected into the mold can be further suppressed, and the above ferrule can be more suitably molded. On the other hand, in the above ferrule, the void portion may extend from the accommodation hole toward the front end surface, and may be separated from the front end surface. Accordingly, when each of the optical fibers is mounted in the ferrule, an adhesive agent for fixing the optical fiber to the ferrule can be suppressed from leaking to the front end surface through the void portion.

In the above ferrule, the void portion may be provided in at least one of a first region located on one side with respect to the plurality of fiber retaining holes in a third direction intersecting the first direction and the second direction, and a second region located on the other side. When the ferrule is molded, a large shrinkage stress may be applied to the constant diameter region of each of the retaining hole forming pins of the mold in the third direction due to the gate position of the mold and the shape of the ferrule. Even in such a case, since the void portion is provided in the above region, the shrinkage stress applied to the constant diameter region of each of the retaining hole forming pins in the third direction can be effectively reduced. Accordingly, the bending of the constant diameter portion of each of the fiber retaining holes in the third direction can be effectively suppressed.

In the above ferrule, the void portion may include a plurality of first portions provided in the first region. The plurality of first portions may be aligned with the plurality of fiber retaining holes in the third direction, respectively. When the ferrule is molded, a large shrinkage stress may be applied from the first region on the one side to the constant diameter region of each of the retaining hole forming pins of the mold in the third direction due to the gate position of the mold and the shape of the ferrule. Even in such a case, since the plurality of first portions of the void portion are aligned with the constant diameter portions of the plurality of fiber retaining holes in the first region, respectively, the shrinkage stress applied to the constant diameter region of each of the retaining hole forming pins in the third direction can be effectively reduced. Accordingly, the bending of the constant diameter portion of each of the fiber retaining holes in the third direction can be effectively suppressed.

In the above ferrule, the void portion may include one first portion provided in the first region. The first portion may have a shape extending along the second direction in a cross section perpendicular to the first direction, and may be aligned with the constant diameter portions of the plurality of fiber retaining holes in the third direction. When the ferrule is molded, a large shrinkage stress may be applied from the first region on the one side to the constant diameter region of each of the retaining hole forming pins of the mold in the third direction due to the gate position of the mold and the shape of the ferrule. Even in such a case, since the first portion of the void portion is aligned with the constant diameter portions of the plurality of fiber retaining holes in the first region in the third direction, the shrinkage stress applied to the constant diameter region of each of the retaining hole forming pins in the third direction can be effectively reduced. Accordingly, the bending of the constant diameter portion of each of the fiber retaining holes in the third direction can be effectively suppressed. Further, since the cross section of the first portion has a shape extending along the second direction, the region of the void portion can be secured more largely. Accordingly, the shrinkage stress applied to the constant diameter region of each of the retaining hole forming pins in the third direction can be more effectively reduced, and the bending of the constant diameter portion of each of the fiber retaining holes in the third direction can be more effectively suppressed.

In the above ferrule, the void portion may include a plurality of second portions provided in the second region located on the other side. The plurality of second portions may be aligned with the constant diameter portions of the plurality of fiber retaining holes in the third direction, respectively. When the ferrule is molded, a large shrinkage stress may be applied from the second region on the other side to the constant diameter region of each of the retaining hole forming pins of the mold in the third direction due to the gate position of the mold and the shape of the ferrule. Even in such a case, since the plurality of second portions of the void portion are aligned with the constant diameter portions of the plurality of fiber retaining holes in the second region, respectively, the shrinkage stress applied to the constant diameter region of each of the retaining hole forming pins in the third direction can be effectively reduced. Accordingly, the bending of the constant diameter portion of each of the fiber retaining holes in the third direction can be effectively suppressed.

In the above ferrule, the void portion may include one second portion provided in the second region located on the other side. The second portion may have a shape extending along the second direction in a cross section perpendicular to the first direction, and may be aligned with the constant diameter portions of the plurality of fiber retaining holes in the third direction. When the ferrule is molded, a large shrinkage stress may be applied from the second region on the other side to the constant diameter region of each of the retaining hole forming pins of the mold in the third direction due to the gate position of the mold and the shape of the ferrule. Even in such a case, since the second portion of the void portion is aligned with the constant diameter portions of the plurality of fiber retaining holes in the second region in the third direction, the shrinkage stress applied to the constant diameter region of each of the retaining hole forming pins in the third direction can be effectively reduced. Accordingly, the bending of the constant diameter portion of each of the fiber retaining holes in the third direction can be effectively suppressed. Further, since the cross section of the second portion has a shape extending along the second direction, the region of the void portion can be secured more largely. Accordingly, the shrinkage stress applied to the constant diameter region of each of the retaining hole forming pins in the third direction can be more effectively reduced, and the bending of the constant diameter portion of each of the fiber retaining holes in the third direction can be more effectively suppressed.

The above ferrule may further include a pair of guide holes respectively provided at positions at which the plurality of fiber retaining holes are interposed between the guide holes in the second direction. The void portion may be provided in at least one of a third region between the plurality of fiber retaining holes and one guide hole and a fourth region between the plurality of fiber retaining holes and the other guide hole. When the ferrule is molded by using the mold including the retaining hole forming pins, a large shrinkage stress may be applied to the constant diameter region of each of the retaining hole forming pins of the mold in the second direction due to the gate position of the mold and the shape of the ferrule. Even in such a case, since the void portion is provided in the above region, the shrinkage stress applied to the constant diameter region of each of the retaining hole forming pins in the second direction can be effectively reduced. Accordingly, the bending of the constant diameter portion of each of the fiber retaining holes in the second direction can be effectively suppressed.

In the above ferrule, a minimum value of a width in the plane of a hole forming the void portion may be 0.4 mm or less. In this case, it is possible to differentiate between the void portion and the guide hole. In addition, a separation distance between a hole forming the void portion and the plurality of fiber retaining holes may be 0.2 mm or more and 0.5 mm or less. In this case, the shrinkage stress of the resin applied to the constant diameter region of each of the retaining hole forming pins in the plane can be more reliably reduced, and the occurrence of bending in the constant diameter region of each of the retaining hole forming pins can be further suppressed.

An optical connector according to one embodiment includes: the ferrule including any one of the above configurations; and a plurality of optical fibers that are retained by the plurality of fiber retaining holes, respectively. Since the optical connector includes any one of the above ferrules, the bending of the constant diameter portion of each of the fiber retaining holes is suppressed. Accordingly, when the optical fiber is mounted in the fiber retaining hole, the positional shift of each of the optical fibers in the front end surface after being polished can be reduced. Accordingly, when the above optical connector is optically connected to an optical connector which is a mating connector, an increase in loss of optical connection between the optical connectors can be suppressed. Further, according to the above optical connector, it is not required to separately prepare a component for suppressing the bending of the constant diameter portion of each of the fiber retaining holes, and additional work is not required when each of the optical fibers is inserted into the ferrule, so that an increase in production cost and production man-hours can be suppressed.

Details of Embodiment of Present Disclosure

Specific examples of a ferrule and an optical connector according to an embodiment of the present disclosure will be described below with reference to the drawings. It is intended that the present invention is not limited to the examples, and is implied by the claims and includes the concept equivalent to the claims and all changes within the scope. In the following description, the same reference signs will be assigned to the same components in the description of the drawings, and duplicate descriptions will be appropriately omitted.

FIG. 1 is a perspective view illustrating a ferrule 10 according to the present embodiment. In FIG. 1, to facilitate understanding, an XYZ coordinate system is illustrated. In the following description, a longitudinal direction (namely, connection direction) of the ferrule 10 is defined as an X direction, a lateral direction of the ferrule 10, which is a direction intersecting (in one example, orthogonal to) the X direction, is defined as a Y direction, and a thickness direction of the ferrule 10, which is a direction intersecting (in one example, orthogonal to) the X direction and the Y direction, is defined as a Z direction.

The ferrule 10 has a substantially rectangular parallelepiped appearance, and is made of, for example, a resin. The ferrule 10 has a front end surface 11 and a rear end surface 12 that are aligned along the X direction. The front end surface 11 is disposed at one end of the ferrule 10 in the X direction, and faces an optical connector that is a mating connector. The rear end surface 12 is disposed at the other end of the ferrule 10 on an opposite side in the X direction. An opening 13 which collectively receives a plurality of optical fibers 30 (refer to FIGS. 2 and 3) is formed in the rear end surface 12. A window 14 into which an adhesive agent for fixing the plurality of optical fibers 30 to an inner side of the ferrule 10 is injected is formed in a side surface along an X-Y plane of the ferrule 10.

Figure 2:
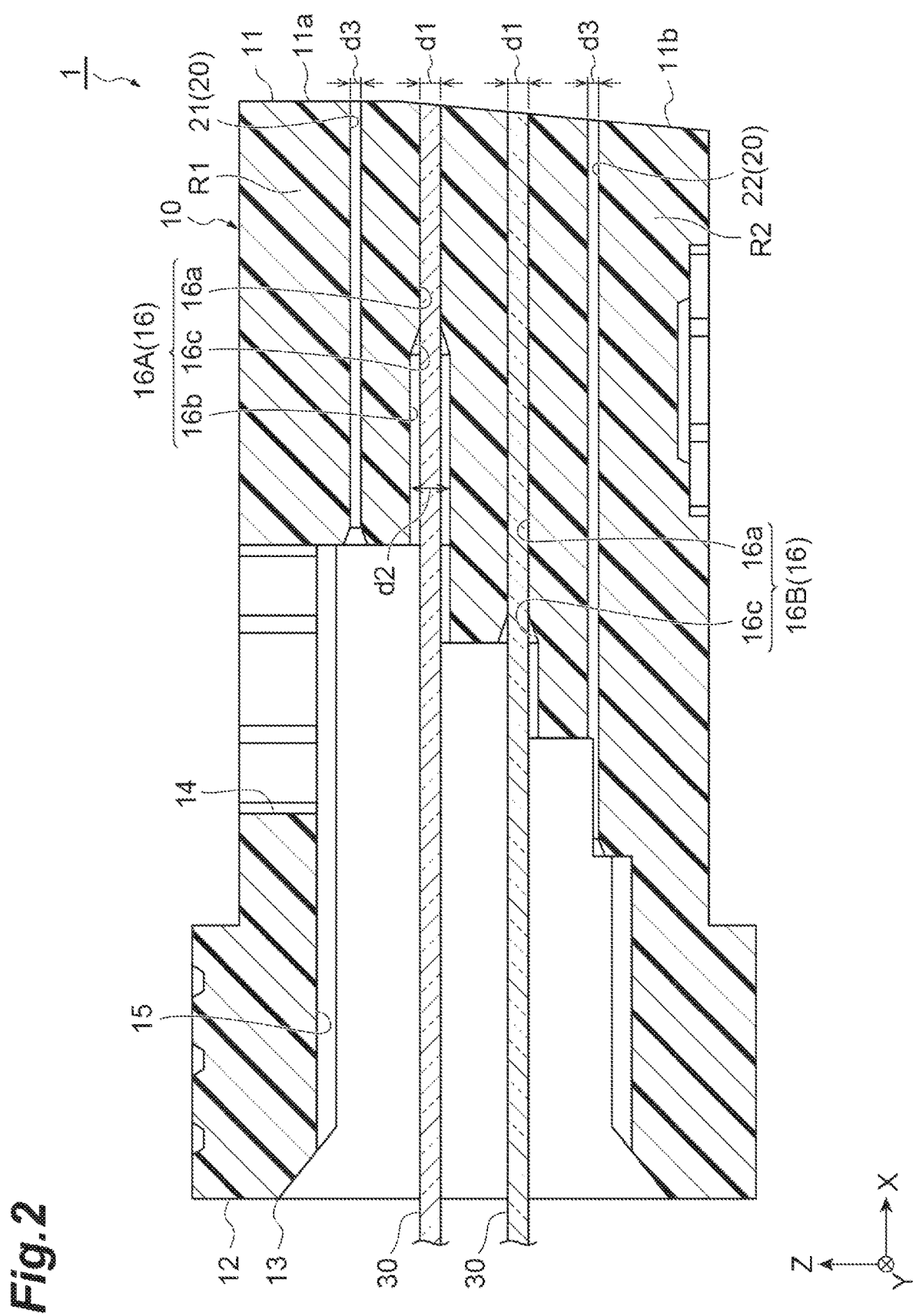
FIG. 2 is a cross-sectional view illustrating an optical connector including the ferrule illustrated in FIG. 1.
Figure 3:
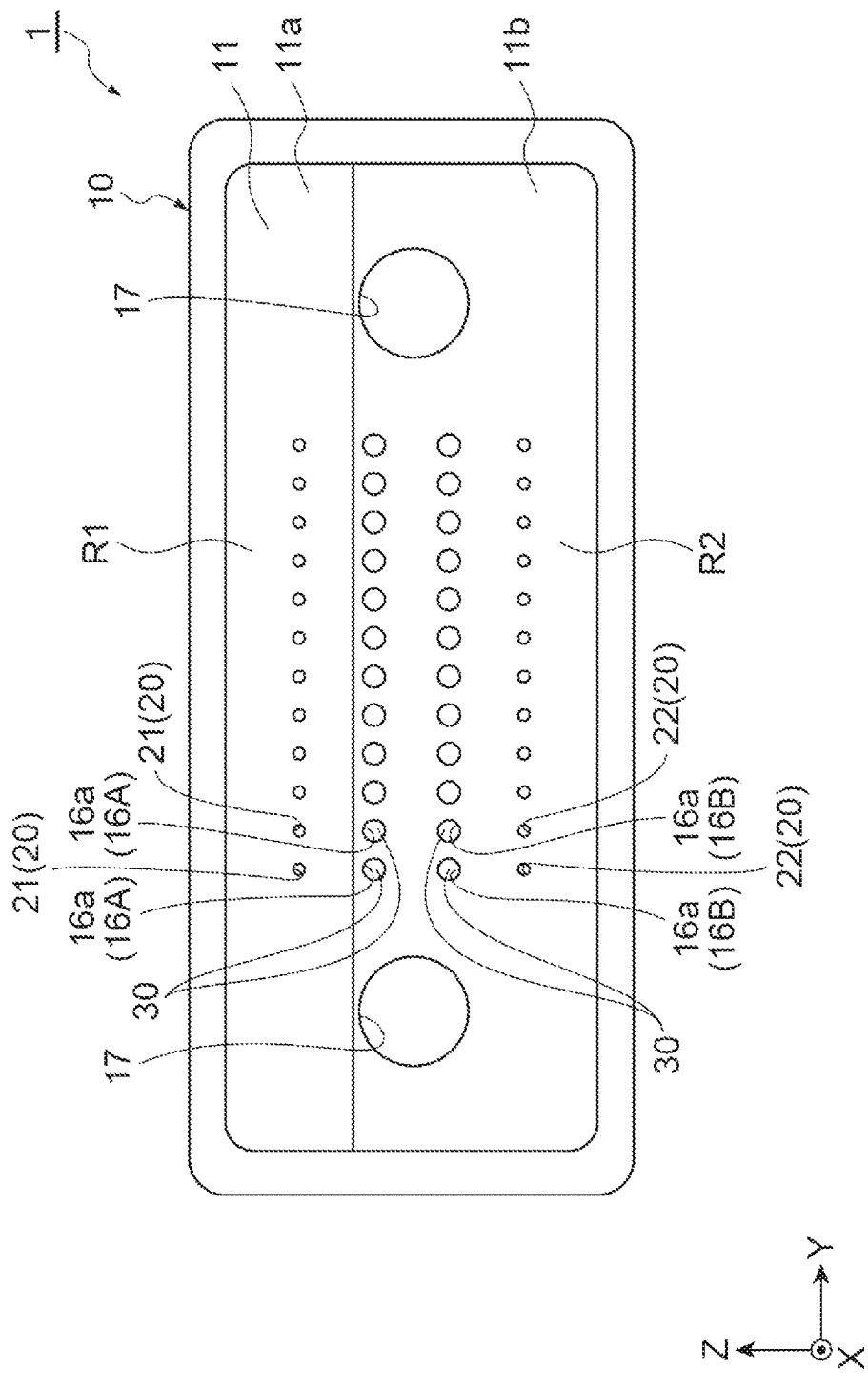
FIG. 3 is a front view illustrating the optical connector illustrated in FIG. 2.

FIG. 2 is a cross-sectional view illustrating an optical connector 1 including the ferrule 10. FIG. 3 is a front view of the optical connector 1 as viewed in the X direction. The optical connector 1 includes the ferrule 10 and the plurality of optical fibers 30 retained by the ferrule 10. The front end surface 11 of the ferrule 10 includes a flat portion 11a along a Y-Z plane and an inclined portion 11b that is slightly inclined (for example, 8° or less) from the flat portion 11a.

The ferrule 10 includes an accommodation hole 15 that extends from the opening 13 of the rear end surface 12 along the X direction and accommodates the plurality of optical fibers 30, and a plurality of fiber retaining holes 16 that extend from the accommodation hole 15 toward the front end surface 11 along the X direction and retain the plurality of optical fibers 30, respectively. A tip portion of the accommodation hole 15 on a front end surface 11 side in the X direction communicates with the window 14 of the ferrule 10 in the Z direction. The plurality of fiber retaining holes 16 penetrate through the ferrule 10 from the accommodation hole 15 to the front end surface 11 in the X direction. A tip of each of the fiber retaining holes 16 is open in the inclined portion 11b of the front end surface 11. Each of the fiber retaining holes 16 has, for example, a circular shape in a Y-Z cross section.

The plurality of fiber retaining holes 16 are aligned in the Y direction and the Z direction. Specifically, one or a plurality of retaining hole rows in each of which the plurality of fiber retaining holes 16 are configured to be aligned along the Y direction are aligned. In the example illustrated in FIG. 3, two retaining hole rows (twenty-four in total) in each of which twelve fiber retaining holes 16 are configured to be aligned along the Y direction are aligned along the Z direction. As illustrated in FIG. 2, each of fiber retaining holes 16A forming one retaining hole row (specifically, a retaining hole row on a window 14 side in the Z direction) of the retaining hole rows includes a constant diameter portion 16a having a constant inner diameter d1; a constant diameter portion 16b having a constant inner diameter d2 that is larger than the inner diameter d1, and a tapered portion 16c provided between the constant diameter portion 16a and the constant diameter portion 16b in the X direction.

The constant diameter portion 16a extends from an opening in the inclined portion 11b of the front end surface 11 to the tapered portion 16c along the X direction. The constant diameter portion 16b extends from the tapered portion 16c to the accommodation hole 15 along the X direction. The inner diameter d1 of the constant diameter portion 16a is, for example, 124 µm or more and 128 µm or less, and the inner diameter from a front end to a rear end of the constant diameter portion 16a is constant. The inner diameter d2 of the constant diameter portion 16b is, for example, 150 µm or more and 250 µm or less, and the inner diameter from a front end to a rear end of the constant diameter portion 16b is constant. The tapered portion 16c is gradually reduced in diameter as extending from the constant diameter portion 16b toward the constant diameter portion 16a in the X direction. The tapered portion 16c guides insertion of the optical fiber 30 from the constant diameter portion 16b into the constant diameter portion 16a.

Each of fiber retaining holes 16B forming the other retaining hole row (specifically, a retaining hole row on a side opposite to the window 14 in the Z direction) of the two retaining hole rows includes the constant diameter portion 16a and the tapered portion 16c. The tapered portion 16c of each of the fiber retaining holes 16B is connected to the accommodation hole 15, and guides insertion of the optical fiber 30 from the accommodation hole 15 into the constant diameter portion 16a. In the following description, the fiber retaining hole 16A and the fiber retaining hole 16B may be collectively referred to as the fiber retaining hole 16.

As illustrated in FIGS. 1 and 3, the ferrule 10 further includes a pair of guide holes 17 into which a pair of guide pins (not illustrated) are inserted, respectively. The pair of guide pins each are substantially columnar members extending along the X direction, and are used to define the relative position of the ferrule 10 with respect to a ferrule of the optical connector that is a mating connector. The pair of guide holes 17 penetrate through the ferrule 10 from the inclined portion 11b of the front end surface 11 to the rear end surface 12 in the X direction. As illustrated in FIG. 3, the pair of guide holes 17 are provided at positions at which the plurality of fiber retaining holes 16 are interposed therebetween in the Y direction. Each of the guide holes 17 has, for example, a circular shape in a Y-Z cross section. The inner diameter of each of the guide holes 17 is larger than the inner diameter of the fiber retaining hole 16, specifically, the inner diameter d1 of the constant diameter portion 16a and the inner diameter d2 of the constant diameter portion 16b, and is, for example, 0.5 mm or more and 0.75 mm or more.

As illustrated in FIGS. 2 and 3, the ferrule 10 further includes a void portion 20 provided in a region around the plurality of fiber retaining holes 16. The void portion 20 is void holes extending from the accommodation hole 15 toward the front end surface 11 along the X direction. In the present embodiment, the void portion 20 is through-holes penetrating through the ferrule 10 from the accommodation hole 15 to the front end surface 11 in the X direction, and is open in the front end surface 11. The void portion 20 is provided along at least a part (entirety in the present embodiment) of the fiber retaining hole 16, which includes the constant diameter portion 16a, and is formed to be aligned along at least the part (entirety in the present embodiment) of the fiber retaining hole 16 in the Y-Z plane.

The void portion 20 is provided in at least one of a region R1 located on one side (specifically, the window 14 side) with respect to the plurality of fiber retaining holes 16 in the Z direction and a region R2 located on the other side in the Z direction. In the present embodiment, the void portion 20 is provided in both the region R1 and the region R2. The void portion 20 includes a plurality of upper portions 21 provided in the region R1 and a plurality of lower portions 22 provided in the region R2.

As illustrated in FIG. 3, the plurality of upper portions 21 provided in the region R1 are aligned in one row along the Y direction, and are aligned with the plurality of fiber retaining holes 16 in the Z direction, respectively. Specifically, the number of the plurality of upper portions 21 is the same number (twelve in the example illustrated in FIG. 3) as the number of a plurality of the fiber retaining holes 16A or 16B forming each of the retaining hole rows, and the plurality of upper portions 21 are adjacent to the plurality of fiber retaining holes 16A in the Z direction, respectively. Further, as viewed in the Z direction, central axes of the plurality of upper portions 21 coincide with central axes of the plurality of fiber retaining holes 16, respectively. The separation distance between the upper portion 21 and the constant diameter portion 16a of the fiber retaining hole 16A in the Z direction is, for example, 0.2 mm or more and 0.5 mm or less. Incidentally, the separation distance referred to here is the shortest separation distance connecting points most adjacent to each other in outer diameter portions of the holes. The same applies to the following separation distance as well.

The plurality of lower portions 22 provided in the region R2 are aligned in one row along the Y direction, and are aligned with the plurality of fiber retaining holes 16 in the Z direction, respectively. Specifically, the number of the plurality of lower portions 22 is the same number (twelve in the example illustrated in FIG. 3) as the number of the plurality of fiber retaining holes 16A or 16B forming each of the retaining hole rows, and the plurality of lower portions 22 are adjacent to the plurality of fiber retaining holes 16B in the Z direction, respectively. Further, as viewed in the Z direction, central axes of the plurality of lower portions 22 coincide with central axes of the plurality of fiber retaining holes 16, respectively. The separation distance between the lower portion 22 and the constant diameter portion 16a of the fiber retaining hole 16B in the Z direction is, for example, 0.2 mm or more and 0.5 mm or less.

The upper portions 21 each and the lower portions 22 each have, for example, a circular shape in a Y-Z cross section, and have a constant inner diameter d3. In the present embodiment, since the inner diameter d3 of the upper portion 21 and the lower portion 22 is constant, the inner diameter d3 of the upper portion 21 corresponds to the minimum value of the width in the Y-Z plane of the upper portion 21, and the inner diameter d3 of the lower portion 22 corresponds to the minimum value of the width in the Y-Z plane of the lower portion 22. The inner diameter d3 differs from the inner diameter d1 of the constant diameter portion 16a of the fiber retaining hole 16, and is larger or smaller than the inner diameter d1. In the present embodiment, the inner diameter d3 is smaller than the inner diameter d1 of the constant diameter portion 16a of the fiber retaining hole 16. The inner diameter d3 is, for example, larger than 0 mm and 0.4 mm or less, preferably 0.2 mm or less, and more preferably 0.05 mm or more and 0.15 mm or less.

The inner diameter d3 of each of the upper portions 21 and each of the lower portions 22 may not be constant. Namely, the inner diameter d3 of the upper portion 21 may differ at positions along the X direction on the upper portion 21, and the inner diameter d3 of the lower portion 22 may differ at positions along the X direction on the lower portion 22. In this case, the minimum value of the inner diameter of the upper portion 21 at any position along the X direction of the upper portion 21 may be larger or smaller than the inner diameter d1 of the constant diameter portion 16a. The minimum value of the inner diameter of the lower portion 22 at any position along the X direction of the lower portion 22 may be larger or smaller than the inner diameter d1 of the constant diameter portion 16a. The inner diameters of the upper portion 21 and the lower portion 22 (namely, the minimum values of the widths in the Y-Z plane of the upper portion 21 and the lower portion 22) may differ from each other. The upper portion 21 and the lower portion 22 may have other shapes such as an oval shape, a polygonal shape, and other irregular shapes in a Y-Z cross section. The upper portions 21 each and the lower portions 22 each may have different shapes in a Y-Z cross section.

Each of the number of the plurality of upper portions 21 and the number of the plurality of lower portions 22 may be larger or smaller than the number of the plurality of fiber retaining holes 16A or 16B forming each of the retaining hole rows. The number of the plurality of upper portions 21 may be larger or smaller than the number of the plurality of lower portions 22. The upper portions 21 and the lower portions 22 each may not be arranged in one row along the Y direction. Namely, the upper portions 21 and the lower portions 22 may be arranged in a plurality of rows.

The plurality of optical fibers 30 extend along the X direction and are aligned in the Y direction and the Z direction to correspond to the plurality of fiber retaining holes 16, respectively. In the present embodiment, as illustrated in FIG. 3, two fiber rows (twenty-four in total) in each of which twelve optical fibers 30 are configured to be aligned along the Y direction are aligned along the Z direction. The plurality of optical fibers 30 are retained by the constant diameter portions 16a of the plurality of fiber retaining holes 16, respectively. The tip of each of the optical fibers 30 is exposed in the front end surface 11 of the ferrule 10. The optical fiber 30 may be a multi-mode optical fiber (MMF) or a single-mode optical fiber (SMF). The number of the optical fibers 30 forming each of the fiber rows is not limited to twelve, and may be other numbers such as four, eight, and sixteen. When eight optical fibers 30 forming each of the fiber rows are aligned, four optical fibers 30 may be disposed on each of both sides between which a portion of the ferrule 10 located at the center when twelve optical fibers 30 are aligned is interposed. The number of the fiber rows may be one, or may be three or four or more.

Figure 4:
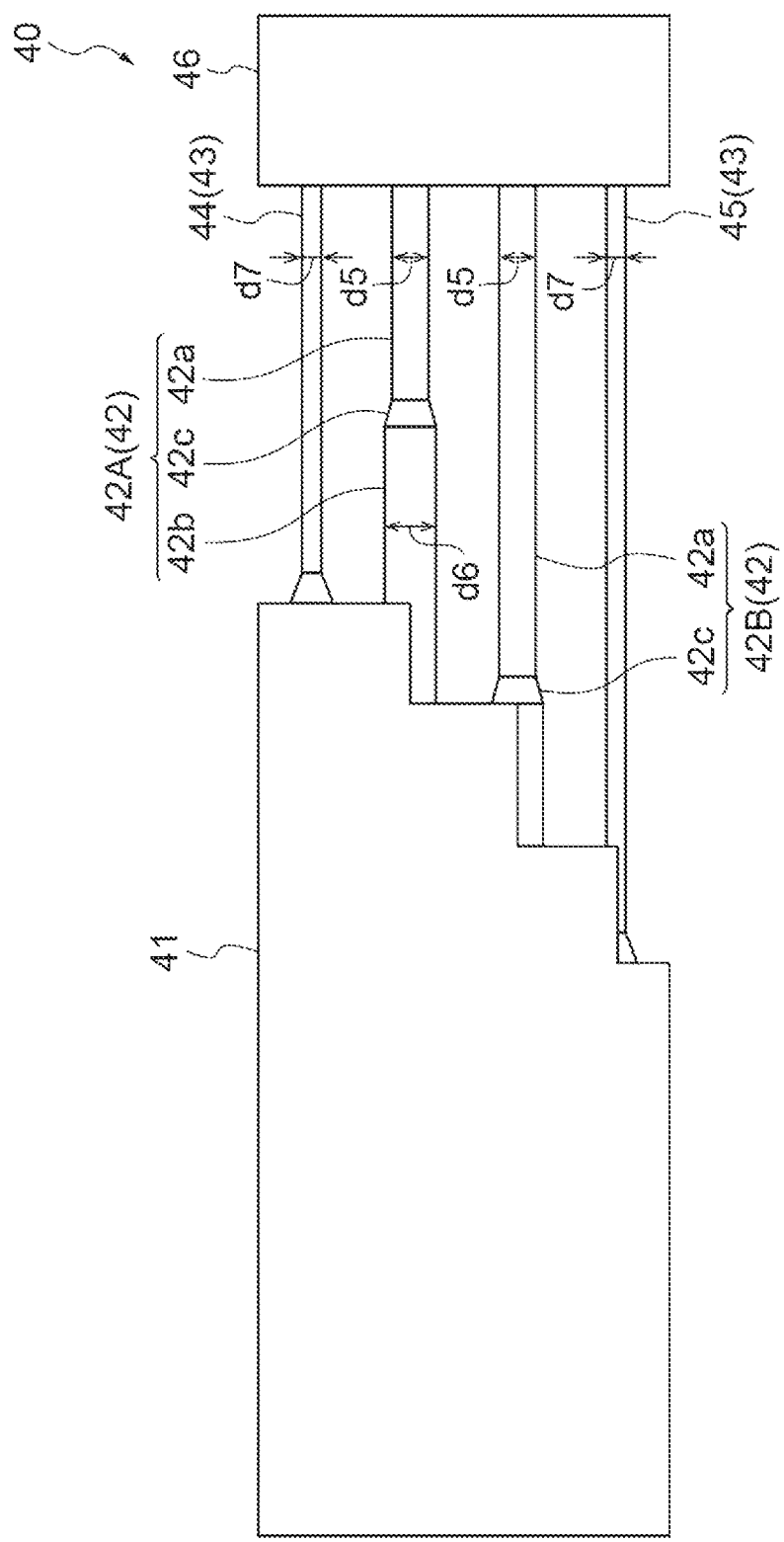
FIG. 4 is a side view illustrating a middle mold of a mold for molding the optical connector illustrated in FIG. 1.

Subsequently, a mold used when molding the ferrule 10 described above will be described with reference to FIG. 4. FIG. 4 is a side view illustrating a middle mold 40 of the mold. The mold includes the middle mold 40, and an upper mold and a lower mold (not illustrated) that interpose the middle mold 40 therebetween. The upper mold and the lower mold interpose the middle mold 40 therebetween to form a cavity (namely, internal space) into which a molten resin is introduced. The middle mold 40 includes a main body portion 41 that has a rectangular parallelepiped shape and is for forming the accommodation hole 15 of the ferrule 10; a plurality of retaining hole forming pins 42 for respectively forming the plurality of fiber retaining holes 16 of the ferrule 10; and a plurality of void portion forming pins 43 for forming the void portion 20 of the ferrule 10.

The plurality of retaining hole forming pins 42 of the middle mold 40 protrude from the main body portion 41 in the X direction, and are disposed to correspond to the plurality of fiber retaining holes 16, respectively. Each of retaining hole forming pins 42A corresponding to each of the fiber retaining holes 16A includes a constant diameter portion 42a corresponding to the constant diameter portion 16a of the fiber retaining hole 16A; a constant diameter portion 42b corresponding to the constant diameter portion 16b of the fiber retaining hole 16A; and a tapered portion 42c corresponding to the tapered portion 16c of the fiber retaining hole 16A. An outer diameter d5 of the constant diameter portion 42a of the retaining hole forming pin 42A is the same as the inner diameter d1 of the constant diameter portion 16a of the fiber retaining hole 16A. An outer diameter d6 of the constant diameter portion 42b of the retaining hole forming pin 42A is the same as the inner diameter d2 of the constant diameter portion 16b of the fiber retaining hole 16A. Each of retaining hole forming pins 42B corresponding to each of the fiber retaining holes 16B includes the constant diameter portion 42a corresponding to the constant diameter portion 16a of the fiber retaining hole 16B and the tapered portion 42c corresponding to the tapered portion 16c of the fiber retaining hole 16B. The outer diameter d5 of the constant diameter portion 42a of the retaining hole forming pin 42B is the same as the inner diameter d1 of the constant diameter portion 16a of the fiber retaining hole 16B.

The plurality of void portion forming pins 43 protrude from the main body portion 41 in the X direction, and are disposed around the plurality of retaining hole forming pins 42. The plurality of void portion forming pins 43 include a plurality of void portion forming pins 44 that correspond to the plurality of upper portions 21 of the void portion 20, respectively, and a plurality of void portion forming pins 45 that correspond to the plurality of lower portions 22 of the void portion 20, respectively. The plurality of void portion forming pins 44 are disposed on one side with respect to the plurality of retaining hole forming pins 42 in the Z direction. The plurality of void portion forming pins 45 are disposed on the other side with respect to the plurality of retaining hole forming pins 42 in the Z direction. The void portion forming pins 44 each and the void portion forming pins 45 each have the same outer diameter d7, and the outer diameter d7 is the same as the inner diameter d3 of the upper portion 21 and the lower portion 22. Tips of the void portion forming pins 43 and tips of the retaining hole forming pins 42 are supported by a pin supporting member 46 disposed outside the front end surface 11 of the ferrule 10.

A resin is injected into the mold having the above-described configuration and is solidified to form the ferrule 10 illustrated in FIG. 1. The plurality of optical fibers 30 are mounted in the ferrule 10 which has been molded, so that the optical connector 1 illustrated in FIGS. 2 and 3 can be obtained. When the plurality of optical fibers 30 are mounted in the ferrule 10, the plurality of optical fibers 30 are introduced from the opening 13 of the rear end surface 12 of the ferrule 10 into the accommodation hole 15 to be retained by the constant diameter portions 16a of the plurality of fiber retaining holes 16, respectively. Thereafter, an adhesive agent is injected from the window 14 of the ferrule 10, and the plurality of optical fibers 30 are fixed to the ferrule 10 with the adhesive agent. Thereafter, the front end surface 11 of the ferrule 10 and the tip of each of the optical fibers 30 exposed from the front end surface 11 are polished to be inclined by a predetermined angle (for example, 8° with respect to the flat portion 11a of the front end surface 11 in order to reduce the reflection of light during optical connection. The inclined portion 11b of the front end surface 11 is formed by the polishing.

Figure 11:
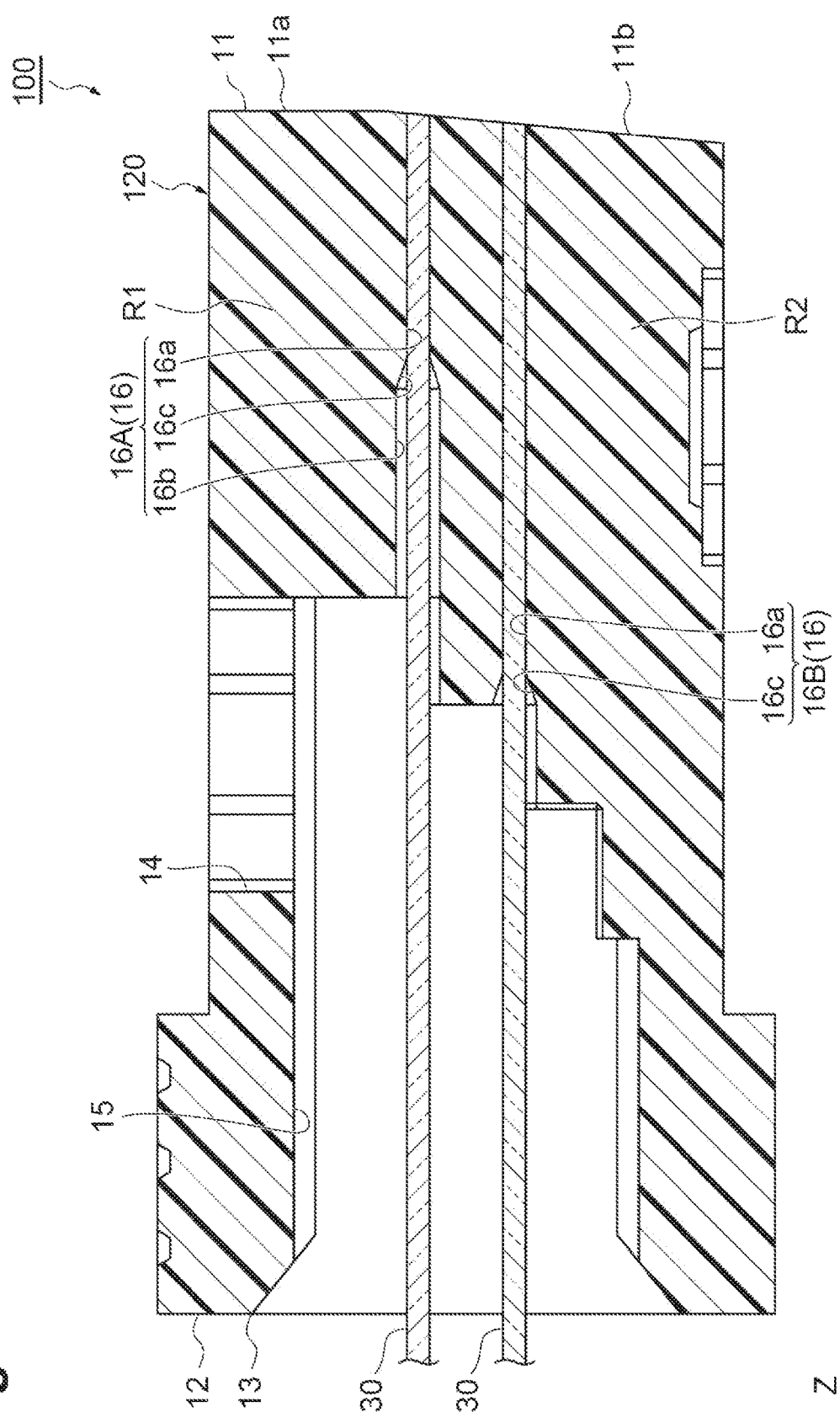
FIG. 11 is a cross-sectional view illustrating an optical connector according to a comparative example.

Effects obtained by the ferrule 10 and the optical connector 1 according to the present embodiment described above will be described together with problems of a comparative example. FIG. 11 is a cross-sectional view illustrating an optical connector 100 according to a comparative example. A ferrule 120 of the optical connector 100 according to the comparative example differs from the ferrule 10 according to the present embodiment in that the void portion 20 is not provided. In the ferrule 120, as compared to the amount of a resin in a region between the fiber retaining holes 16A and 16B in the Z direction, the amount of the resin in the region R1 and the region R2 outside the region is much larger. Further, the shape of the ferrule 120 is asymmetrical with respect to the X-Y plane passing through the center in the Z direction of the ferrule 120, and the amount of the resin in the region R1 and the amount of the resin in the region R2 differ from each other.

When the ferrule 120 having such a configuration is molded by using a mold, shrinkage stress caused by shrinkage of the resin is applied to each of the retaining hole forming pins of the mold in the Y-Z plane, so that bending in the Y-Z plane may occur in each of the retaining hole forming pins in a step of solidifying the resin. The direction of the shrinkage stress is affected and changed by, for example, a difference in amount of the resin in the ferrule 120, the shape of the ferrule 120, the gate position of the mold, and the like. When bending occurs in each of the retaining hole forming pins due to the shrinkage stress, bending occurs also in the constant diameter portion 16a of each of the fiber retaining holes 16 of the ferrule 120 accordingly. If such bending occurs, when the front end surface 11 of the ferrule 120 is polished, the opening position of the constant diameter portion 16a in the front end surface 11 may be shifted by polishing.

Figure 12:
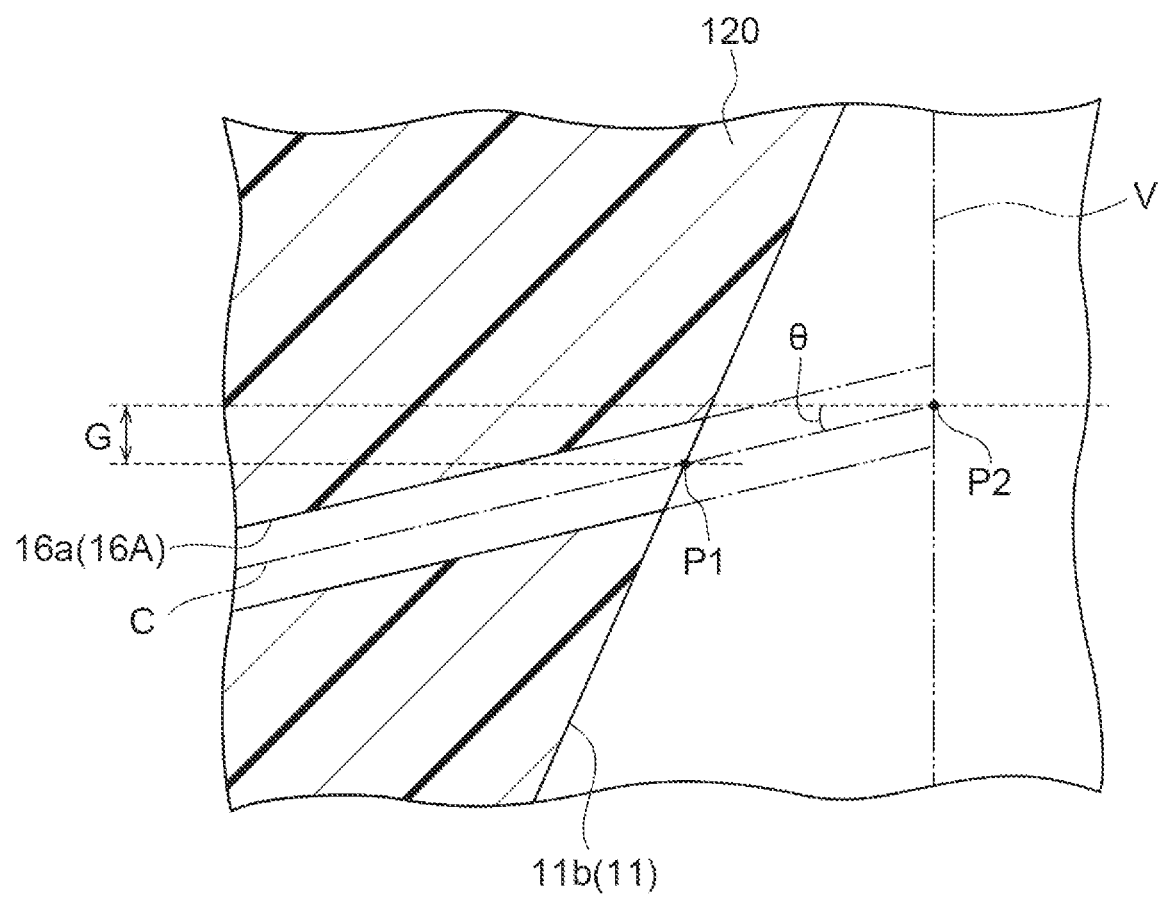
FIG. 12 is an enlarged cross-sectional view of a part of the optical connector illustrated in FIG. 11.

FIG. 12 is an enlarged cross-sectional view of the vicinity of the tip of the fiber retaining hole 16A of the optical connector 100. In FIG. 12, the optical fiber 30 is not illustrated. In FIG. 12, a virtual plane V indicates the position of the front end surface 11 of the ferrule 120 before polishing. When the above-described bending occurs, an extending direction of a central axis C of the constant diameter portion 16a of the fiber retaining hole 16A may be inclined by an angle θ with respect to a normal direction of the virtual plane V.

When the front end surface 11 is polished in a state where the extending direction of the central axis C is inclined in such a manner, the opening position of the constant diameter portion 16a of the fiber retaining hole 16A in the front end surface 11 is shifted as the polishing makes progress. Specifically, a center position P2 of an opening of the constant diameter portion 16a in the front end surface 11 after being polished is shifted by a shift amount G with respect to a center position P1 of the opening of the constant diameter portion 16a in the virtual plane V in the Z direction. When the optical fiber 30 is inserted into the fiber retaining hole 16A, such a shift to the center position P2 of the opening causes the positional shift of the optical fiber 30 in the front end surface 11, and thus can be a factor to cause an increase in loss of optical connection.

On the other hand, in the ferrule 10 according to the present embodiment, the void portion 20 is provided in the region around the plurality of fiber retaining holes 16, and the void portion 20 is provided along the constant diameter portions 16a of the plurality of fiber retaining holes 16, and is formed to be aligned with the constant diameter portions 16a in the Y-Z plane. When the ferrule 10 including the void portion 20 is molded, since the plurality of void portion forming pins 43 for forming the void portion 20 are disposed around the constant diameter portions 42a of the plurality of retaining hole forming pins 42, the balance of shrinkage stress of the resin applied to the region around the constant diameter portion 42a of each of the retaining hole forming pins 42 can be improved in a step of solidifying the resin. Accordingly, the shrinkage stress of the resin applied to the constant diameter portion 42a of each of the retaining hole forming pins 42 in the Y-Z plane can be reduced, and the occurrence of bending in the constant diameter portion 42a of each of the retaining hole forming pins 42 can be suppressed. Accordingly, the bending of the constant diameter portion 16a of each of the fiber retaining holes 16 can be suppressed, so that a shift in opening position of each of the fiber retaining holes 16 in the front end surface 11 can be reduced after the front end surface 11 is polished. Accordingly, when the ferrule 10 is mounted in the optical connector 1, the positional shift of each of the optical fibers 30 in the front end surface 11 can be reduced, and an increase in loss of optical connection can be suppressed.

Further, since the inner diameter d3 of the upper portion 21 and the lower portion 22 is smaller than the inner diameter d1 of the constant diameter portion 16a, the optical fibers 30 can be prevented from being erroneously inserted into the upper portion 21 and the lower portion 22. Further, according to the ferrule 10, it is not required to separately prepare a component for suppressing the bending of the constant diameter portions 16a of the fiber retaining holes 16, and additional work is not required when the optical fibers 30 are inserted into the ferrule 10, so that an increase in production cost and production man-hours can be suppressed. Therefore, according to the ferrule 10 of the present embodiment, while the production cost and the production man-hours are suppressed, a loss of optical connection can be suppressed by suppressing the bending of each of the fiber retaining holes 16.

In the ferrule 10 according to the present embodiment, the void portion 20 penetrates through the ferrule 10 from the accommodation hole 15 to the front end surface 11. Accordingly, when the ferrule 10 is molded, the tip of each of the void portion forming pins 43 of the mold can be supported by the pin supporting member 46 disposed outside the front end surface 11. In this case, as compared to a case where the void portion forming pins 43 are supported in a cantilever manner without the tips of the void portion forming pins 43 being supported by the pin supporting member 46, the turbulence of the flow of the resin injected into the mold can be further suppressed, and the ferrule 10 can be more suitably molded.

In the ferrule 10 according to the present embodiment, the void portion 20 is provided in both of the region R1 located on the one side with respect to the plurality of fiber retaining holes 16 in the Z direction and the region R2 located on the other side. When the ferrule 10 is molded, a large shrinkage stress may be applied to the constant diameter portion 42a of each of the retaining hole forming pins 42 of the mold in the Z direction due to the gate position of the mold and the shape of the ferrule 10. Even in such a case, since the void portion 20 is provided in the above regions, the shrinkage stress applied to the constant diameter portion 42a of each of the retaining hole forming pins 42 in the Z direction can be effectively reduced. Accordingly, the bending of the constant diameter portion 16a of each of the fiber retaining holes 16 in the Z direction can be effectively suppressed.

In the ferrule 10 according to the present embodiment, the void portion 20 includes the plurality of upper portions 21 provided in the region R1, and the plurality of upper portions 21 are aligned with the plurality of fiber retaining holes 16 in the Z direction, respectively. In such a manner, since the plurality of upper portions 21 of the void portion 20 are aligned with the constant diameter portions 16a of the plurality of fiber retaining holes 16 in the region R1, respectively, the shrinkage stress applied to the constant diameter portion 42a of each of the retaining hole forming pins 42 in the Z direction can be effectively reduced. Accordingly, the bending of the constant diameter portion 16a of each of the fiber retaining holes 16 in the Z direction can be effectively suppressed.

In the ferrule 10 according to the present embodiment, the void portion 20 includes the plurality of lower portions 22 provided in the region R2, and the plurality of lower portions 22 are aligned with the constant diameter portions 16a of the plurality of fiber retaining holes 16 in the Z direction, respectively. In such a manner, since the plurality of lower portions 22 of the void portion 20 are aligned with the constant diameter portions 16a of the plurality of fiber retaining holes 16 in the region R2, respectively, the shrinkage stress applied to the constant diameter portion 42a of each of the retaining hole forming pins 42 in the Z direction can be effectively reduced. Accordingly, the bending of the constant diameter portion 16a of each of the fiber retaining holes 16 in the Z direction can be effectively suppressed.

The optical connector 1 according to the present embodiment includes the ferrule 10 and the plurality of optical fibers 30. Since the optical connector 1 includes the ferrule 10, the bending of the constant diameter portion 16a of each of the fiber retaining holes 16 is suppressed. Accordingly, when the optical fiber 30 is mounted in the fiber retaining hole 16, the positional shift of each of the optical fibers 30 in the front end surface 11 after being polished can be reduced. Accordingly, when the optical connector 10 is optically connected to the optical connector which is a mating connector, an increase in loss of optical connection between the optical connectors can be suppressed. Further, according to the optical connector 1, it is not required to separately prepare a component for suppressing the bending of the constant diameter portion 16a of each of the fiber retaining holes 16, and additional work is not required when each of the optical fibers 30 is inserted into the ferrule 10, so that an increase in production cost and production man-hours can be suppressed.

First Modification Example

Figure 5:
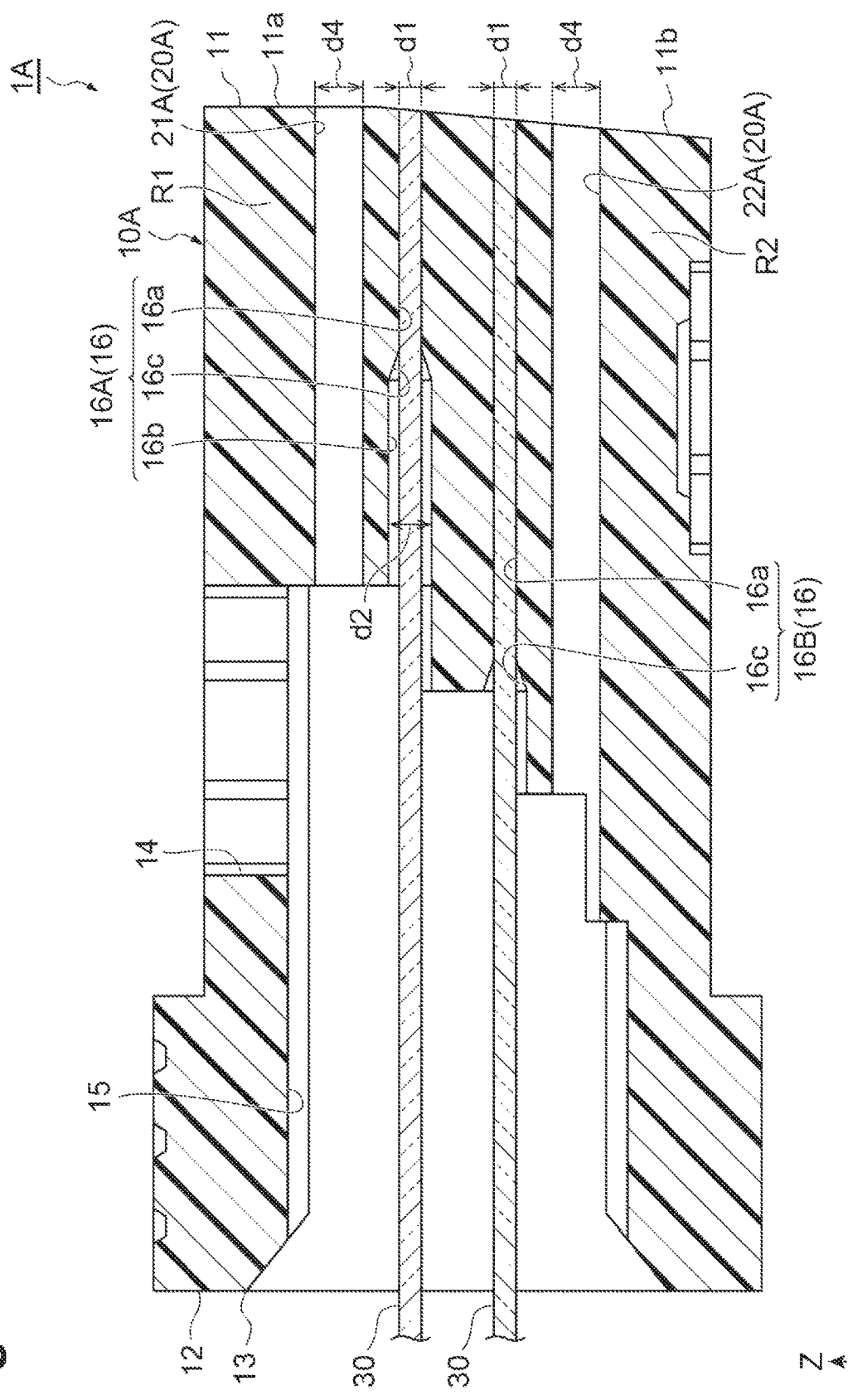
FIG. 5 is a cross-sectional view illustrating an optical connector according to a first modification example.

FIG. 5 is a cross-sectional view illustrating an optical connector 1A according to a first modification example. The point of difference between the present modification example and the above embodiment is the inner diameter of the void portion of the ferrule. In a ferrule 10A according to the present modification example, an inner diameter d4 of each of upper portions 21A and each of lower portions 22A of a void portion 20A is larger than the inner diameter d1 of the constant diameter portion 16a of the fiber retaining hole 16. The inner diameter d4 of the upper portion 21A and the lower portion 22A is, for example, larger than 0.12 mm and 0.25 mm or less, and more preferably, for example, larger than 0.15 mm and 0.2 mm or less. In such a manner, since the inner diameter d4 is set to be larger than the inner diameter d1, when the ferrule 10A is molded, the shrinkage stress of a resin applied to the constant diameter portion 42a of each of the retaining hole forming pins 42 in the Y-Z plane can be effectively reduced. Therefore, the bending of the constant diameter portion 16a of each of the fiber retaining holes 16 can be effectively suppressed. The inner diameter d4 may be the same as the inner diameter d2, or may be smaller or larger than the inner diameter d2 of the constant diameter portion 16b of the fiber retaining hole 16. The inner diameter of the upper portion 21A and the inner diameter of the lower portion 22A may differ from each other.

Second Modification Example

Figure 6A:
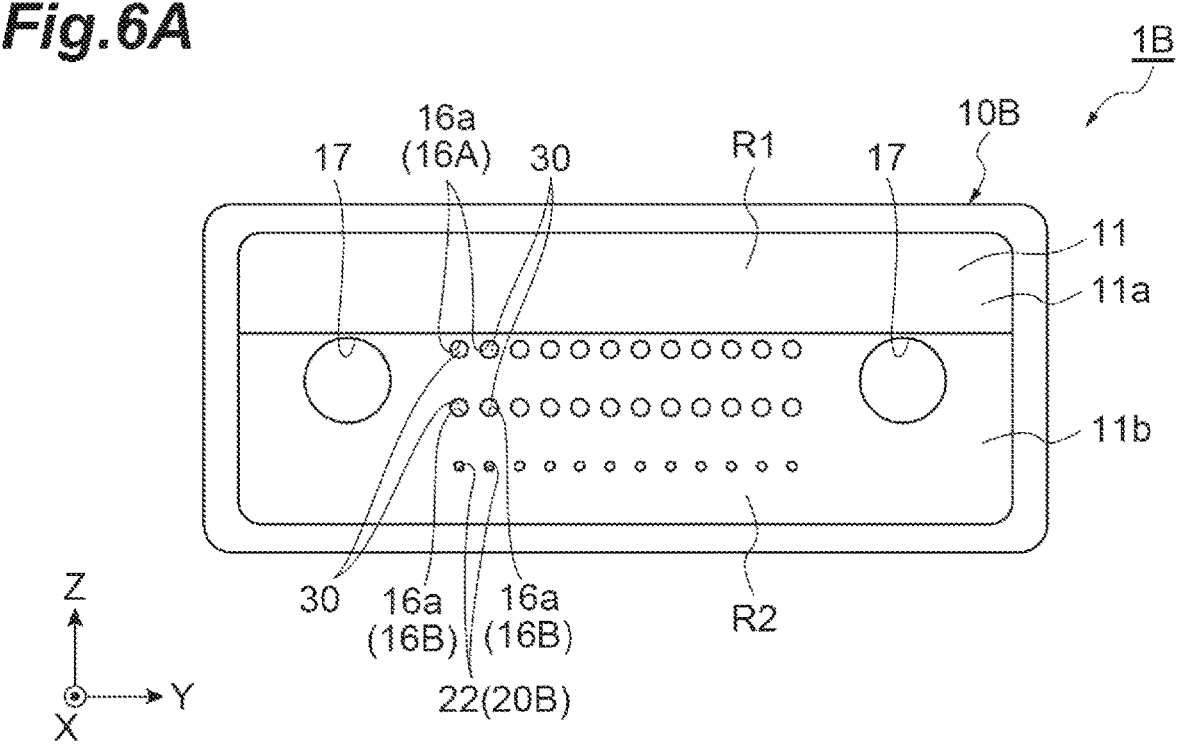
FIG. 6A is a front view illustrating an optical connector according to a second modification example.

FIG. 6A is a front view illustrating an optical connector 1B according to a second modification example. In the present modification example, a void portion 20B of a ferrule 10B is provided in only one of the region R1 and the region R2 of the ferrule 10B. In the example illustrated in FIG. 6A, the void portion 20B is provided only in the region R2. Therefore, the void portion 20B does not include the plurality of upper portions 21 provided in the region R1, but includes only the plurality of lower portions 22 provided in the region R2. When the ferrule 10B is molded, a large shrinkage stress may be applied from the region R2 to the constant diameter portion 42a of each of the retaining hole forming pins 42 of a mold due to the gate position of the mold and the shape of the ferrule 10B. Even in such a case, since the plurality of lower portions 22 are provided in the region R2, the shrinkage stress applied to the constant diameter portion 42a of each of the retaining hole forming pins 42 in the Z direction can be effectively reduced. Accordingly, the bending of the constant diameter portion 16a of each of the fiber retaining holes 16 in the Z direction can be effectively suppressed.

Figure 6B:
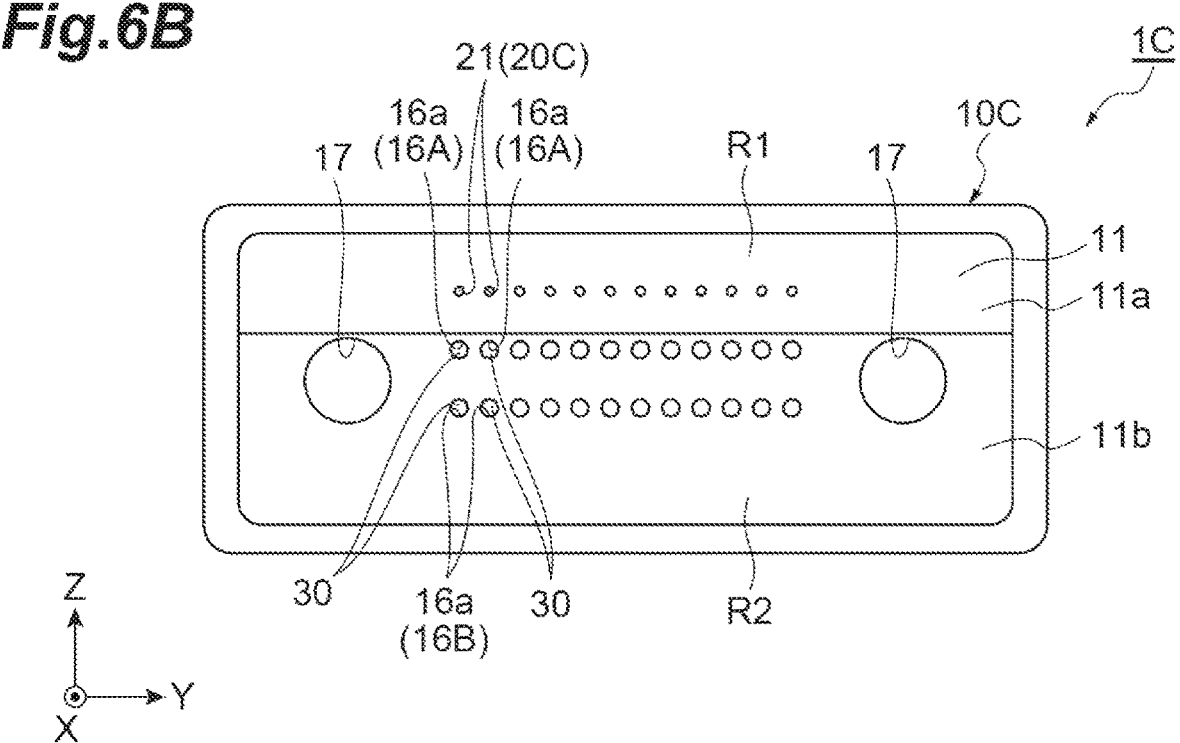
FIG. 6B is a front view illustrating an optical connector according to another example of the second modification example.

FIG. 6B is a front view illustrating an optical connector 1C according to another example of the second modification example. In the example illustrated in FIG. 6B, a void portion 20C of a ferrule 10C is provided only in the region R1. Therefore, the void portion 20C does not include the plurality of lower portions 22 provided in the region R2, but includes only the plurality of upper portions 21 provided in the region R1. When the ferrule 10C is molded, a large shrinkage stress may be applied from the region R1 to the constant diameter portion 42a of each of the retaining hole forming pins 42 of a mold due to the gate position of the mold and the shape of the ferrule 10C. Even in such a case, since the plurality of upper portions 21 are provided in the region R1, the shrinkage stress applied to the constant diameter portion 42a of each of the retaining hole forming pins 42 in the Z direction can be effectively reduced. Accordingly, the bending of the constant diameter portion 16a of each of the fiber retaining holes 16 in the Z direction can be effectively suppressed.

Third Modification Example

Figure 7:
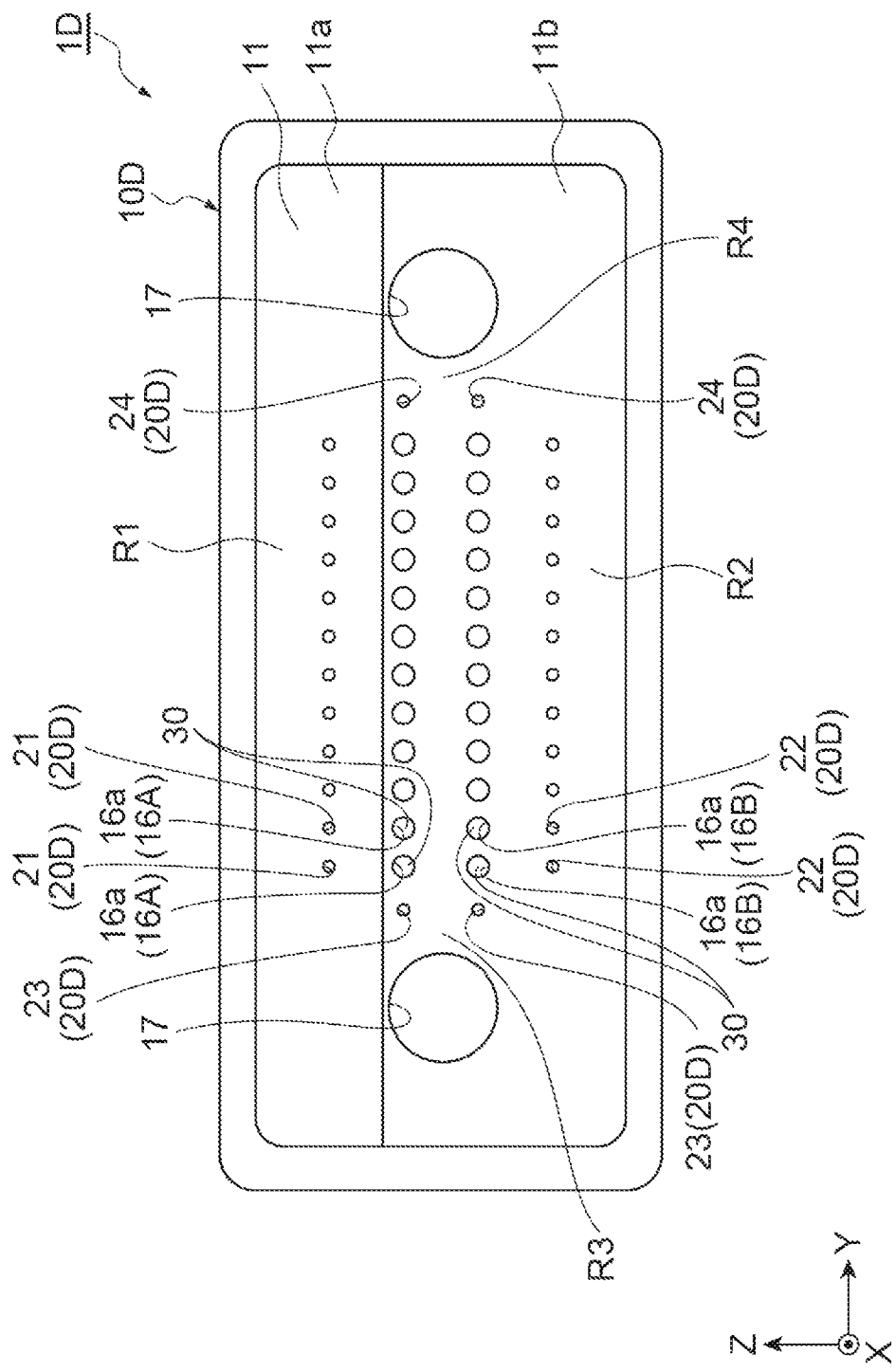
FIG. 7 is a front view illustrating an optical connector according to a third modification example.

FIG. 7 is a front view illustrating an optical connector 1D according to a third modification example. In the present modification example, a void portion 20D of a ferrule 10D further includes a plurality of left portions 23 and a plurality of right portions 24 in addition to the plurality of upper portions 21 and the plurality of lower portions 22. The left portion 23 has the same configuration as those of the upper portion 21 and the lower portion 22 except for the disposition and the number of the left portions 23. The right portion 24 has the same configuration as those of the upper portion 21 and the lower portion 22 except for the disposition and the number of the right portions 24. The plurality of left portions 23 are provided in a region located on one side (left side in FIG. 7) with respect to the plurality of fiber retaining holes 16 in the Y direction. Specifically, the plurality of left portions 23 are provided in a region R3 between the plurality of fiber retaining holes 16 and one guide hole 17 in the Y direction. The number of the plurality of left portions 23 is the same number as, for example, the number of the retaining hole rows. In the example illustrated in FIG. 7, two left portions 23 are aligned in one row along the Z direction, and are aligned with the two retaining hole rows in the Y direction, respectively. The separation distance between the retaining hole row and the left portion 23 is, for example, 0.1 mm or more and 0.3 mm or less. Specifically, the separation distance is a distance in the Y direction between the fiber retaining hole 16 which is located at one end on a left portion 23 side in the Y direction among the plurality of fiber retaining holes 16 forming the retaining hole row, and the left portion 23 adjacent to the fiber retaining hole 16 in the Y direction.

The plurality of right portions 24 are provided in a region located on the other side (right side in FIG. 7) with respect to the plurality of fiber retaining holes 16 in the Y direction. Specifically, the plurality of right portions 24 are provided in a region R4 between the plurality of fiber retaining holes 16 and the other guide hole 17 in the Y direction. The number of the plurality of right portions 24 is the same number as, for example, the number of the retaining hole rows. In the example illustrated in FIG. 7, two right portions 24 are aligned in one row along the Z direction, and are aligned with the two retaining hole rows in the Y direction, respectively. The separation distance between the retaining hole row and the right portion 24 is, for example, 0.1 mm or more and 0.3 mm or less. Specifically, the separation distance is a distance in the Y direction between the fiber retaining hole 16 which is located at the other end on a right portion 24 side in the Y direction among the plurality of fiber retaining holes 16 forming the retaining hole row, and the right portion 24 adjacent to the fiber retaining hole 16 in the Y direction.

When the ferrule 10D is molded, a large shrinkage stress may be applied to the constant diameter portion 42a of each of the retaining hole forming pins 42 of a mold in the Y direction due to the gate position of the mold and the shape of the ferrule 10D. Even in such a case, since the void portion 20D includes the plurality of left portions 23 provided in the region R3 and the plurality of right portions 24 provided in the region R4, the shrinkage stress applied to the constant diameter portions 42a of the retaining hole forming pins 42 in the Y direction can be effectively reduced. Accordingly, the bending of the constant diameter portions 16a of the fiber retaining holes 16 in the Y direction can be effectively suppressed. The void portion 20D may be provided in only one of the region R3 and the region R4. Namely, the void portion 20D may include only one of the plurality of left portions 23 and the plurality of right portions 24. The number of the plurality of left portions 23 and the number of the plurality of right portions 24 may be larger or smaller than the number of the retaining hole rows. Further, the number of the plurality of left portions 23 and the number of the plurality of right portions 24 may differ from each other.

Fourth Modification Example

Figure 8:
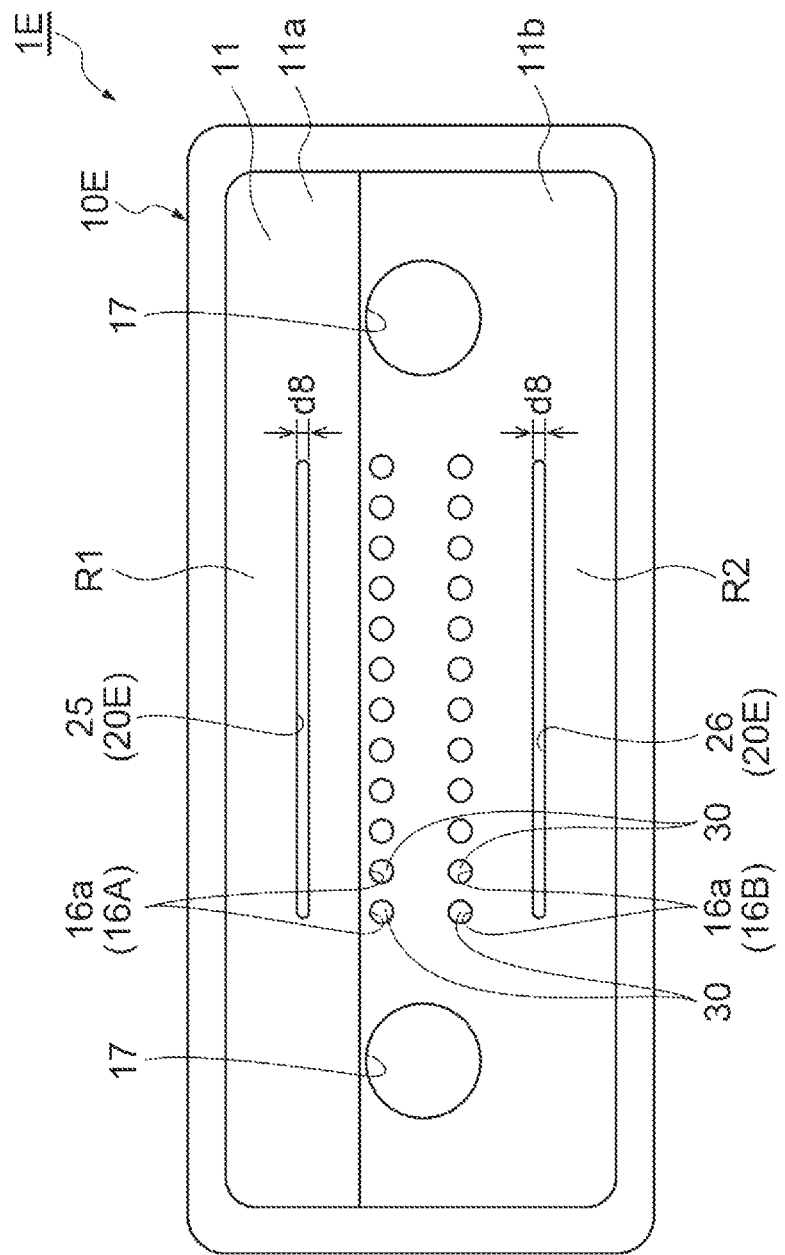
FIG. 8 is a front view illustrating an optical connector according to a fourth modification example.

FIG. 8 is a front view illustrating an optical connector 1E according to a fourth modification example. The point of difference between the present modification example and the above embodiment is the shape of the void portion of the ferrule. In the present modification example, a void portion 20E of a ferrule 10E includes one upper portion 25 instead of the plurality of upper portions 21, and includes one lower portion 26 instead of the plurality of lower portions 22. The upper portion 25 and the lower portion 26 have a shape extending along the Y direction in a Y-Z cross section, and are aligned with the plurality of fiber retaining holes 16 in the Z direction.

In the example illustrated in FIG. 8, the upper portion 25 and the lower portion 26 have an oval shape extending along the Y direction in a Y-Z cross section. The width of the upper portion 25 in the Y direction and the width of the lower portion 26 in the Y direction are the same as each other, and are the same as the entire width of the retaining hole row in the Y direction. A width d8 of the upper portion 25 in the Z direction and the width d8 of the lower portion 26 in the Z direction are the same as each other, and are the same as the inner diameter d3 of each of the upper portion 21 and the lower portion 22 of the above embodiment. The width d8 of the upper portion 25 is constant at positions along the Y direction on the upper portion 25. The width d8 of the lower portion 22 is constant at positions along the Y direction on the lower portion 22. The width d8 of the upper portion 25 corresponds to the minimum value of the width in the Y-Z plane of the upper portion 21, and the width d8 of the lower portion 26 corresponds to the minimum value of the width in the Y-Z plane of the lower portion 22.

According to the present modification example, the region of the upper portion 25 and the region of the lower portion 26 can be secured larger than the region of the upper portion 21 and the region of the lower portion 22 of the above embodiment. Accordingly, when the ferrule 10E is molded, the shrinkage stress applied to the constant diameter portion 42a of each of the retaining hole forming pins 42 in the Z direction can be more effectively reduced, and accordingly, the bending of the constant diameter portion 16a of each of the fiber retaining holes 16 in the Z direction can be more effectively suppressed. The upper portion 25 and the lower portion 26 may extend along the Y direction, and may have shapes other than an oval shape in a Y-Z cross section. For example, the upper portion 25 and the lower portion 26 may have other shapes in a Y-Z cross section, such as an elliptical shape extending in the Y direction and a polygonal shape extending in the Y direction. In addition, in the optical connector 1E, the upper portion 25 or the lower portion 26 may be replaced with the plurality of upper portions 21 or the plurality of lower portions 22.

Fifth Modification Example

Figure 9:
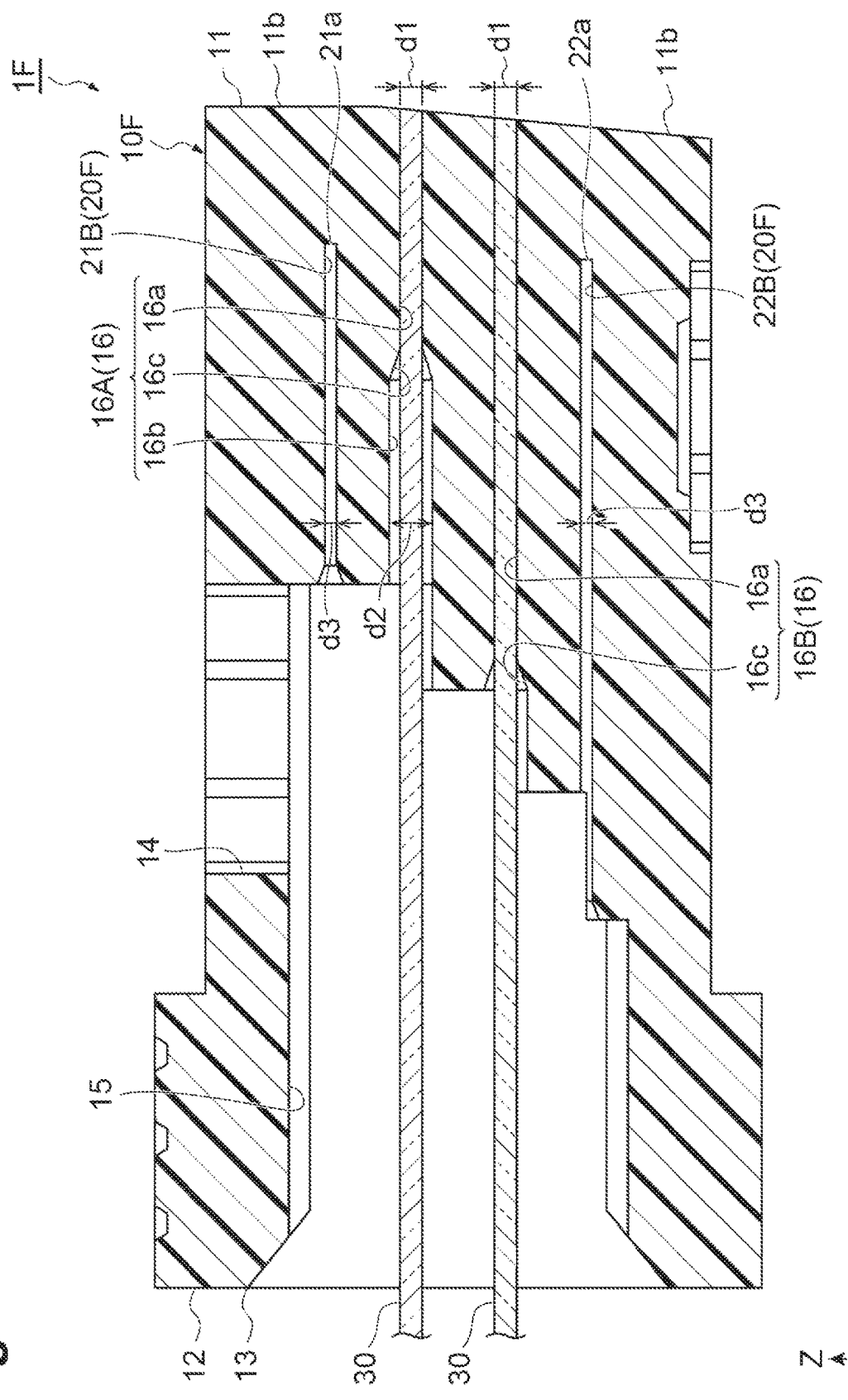
FIG. 9 is a cross-sectional view illustrating an optical connector according to a fifth modification example.

FIG. 9 is a cross-sectional view illustrating an optical connector 1F according to a fifth modification example. In the present modification example, a void portion 20F of a ferrule 10F does not penetrate through the ferrule 10F to the front end surface 11, but is separated from the front end surface 11 in the X direction. Namely, each of a tip 21a of each of upper portions 21B on a front end surface 11 side and a tip 22a of each of lower portions 22B on a front end surface 11 side does not reach the front end surface 11, but is disposed at a position separated from the front end surface 11 in the X direction. The tip 21a of the upper portion 21B and the tip 22a of the lower portion 22B are disposed at the same position as viewed in the Z direction. The distance between the tips 21a,21b of the upper portion 21B and the lower portion 22B, and the Y-Z plane including the flat portion 11a of the front end surface 11 is, for example, 0.1 mm or more and 3.5 mm or less, and more preferably, for example, 0.1 mm or more and 1.7 mm or less.

Since the void portion 20F is separated from the front end surface 11 in such a manner, when each of the optical fibers 30 is mounted in the ferrule 10F, an adhesive agent for fixing the optical fiber 30 to the ferrule 10F can be suppressed from leaking to the front end surface 11 through the upper portion 21B and the lower portion 22B. The tip 21a of the upper portion 21B and the tip 22a of the lower portion 22B may be disposed at different positions as viewed in the Z direction.

Sixth Modification Example

Figure 10:
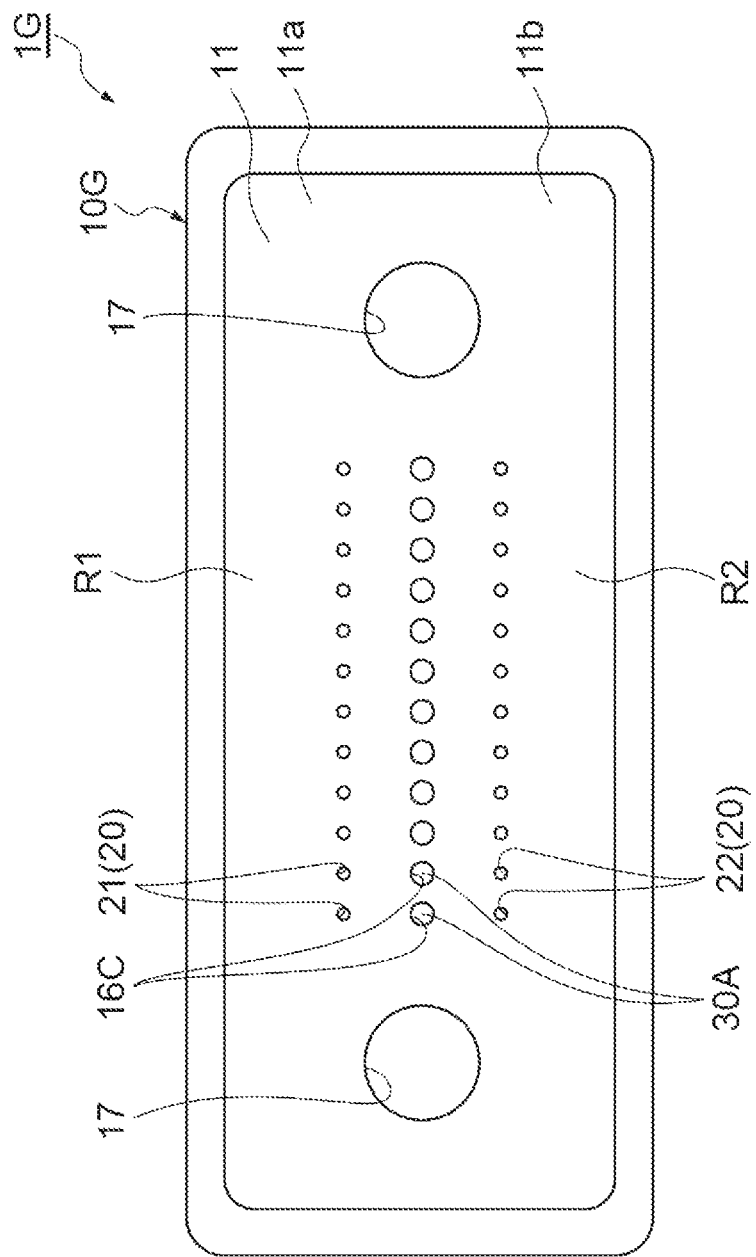
FIG. 10 is a front view illustrating an optical connector according to a sixth modification example.

FIG. 10 is a front view illustrating an optical connector 1G according to a sixth modification example. The point of difference between the above embodiment and the present modification example is the number of the plurality of optical fibers. In the present modification example, a plurality of fiber retaining holes 16C of a ferrule 10G are aligned in one row along the Y direction, and are disposed at the center in the Z direction of the ferrule 10G. The optical fibers 30A are disposed to correspond to the fiber retaining holes 16C, and similarly to the fiber retaining holes 16C, are aligned in one row along the Y direction. Even in a case where the fiber retaining holes 16C are aligned in one row in such a manner, when the ferrule 10G is molded, the shrinkage stress applied from the region R1 to the constant diameter portion 42a of each of the retaining hole forming pins 42 of a mold, and the shrinkage stress applied from the region R2 thereto may differ from each other due to the gate position of the mold and the shape of the ferrule 10G. A difference between the shrinkage stresses can lead to the bending of the constant diameter portion 42a of each of the retaining hole forming pins 42 in the Z direction. Even in such a case, similarly to the above embodiment, since the ferrule 10G is provided with the plurality of upper portions 21 and the plurality of lower portions 22 of the void portion 20, the same effects as those in the above embodiment are obtained.

The ferrule and the optical connector according to the present invention are not limited to the embodiment and the modification examples described above, and can be modified in various forms. For example, the embodiment and the modification examples described above may be combined together according to the required objective and effects. The void portion may be provided in a region other than the region R1, the region R2, the region R3, and the region R4 of the ferrule. The void portion may not be connected to the accommodation hole, and may be separated from the accommodation hole in the X direction.

REFERENCE SIGNS LIST 1, 1A to 1G: optical connector, 10, 10A to 10G: ferrule, 11: front end surface, 11a: flat portion, 11b: inclined portion, 12: rear end surface, 13: opening, 14: window, 15: accommodation hole, 16, 16A to 16C: fiber retaining hole, 16a, 16b: constant diameter portion, 16c: tapered portion, 17: guide hole, 20, 20A to 20F: void portion, 21, 21A, 21B, 25: upper portion, 22, 22A, 22B, 26: lower portion, 23: left portion, 24: right portion, 30, 30A: optical fiber, d1 to d4: inner diameter, d8: width, R1 to R4: region.

The invention claimed is:

1. A ferrule for retaining a plurality of optical fibers, the ferrule comprising:
a front end surface;
a rear end surface located on opposite to the front end surface in a first direction;
a plurality of fiber retaining holes that each extend from the front end surface toward the rear end surface along the first direction, and are disposed along a second direction intersecting the first direction;
an accommodation hole that is connected to the plurality of fiber retaining holes, and is open in the rear end surface; and
a void portion provided in a region around the plurality of fiber retaining holes,
wherein the fiber retaining holes include constant diameter portions extending from the front end surface along the first direction, and
the void portion is provided along the constant diameter portions, and is formed to be aligned with the constant diameter portions in a plane perpendicular to the first direction, and a minimum value of a width in the plane of the void portion differs from an inner diameter of the constant diameter portion.

2. The ferrule according to claim 1,
wherein the void portion penetrates through the ferrule from the accommodation hole to the front end surface.

3. The ferrule according to claim 1,
wherein the void portion extends from the accommodation hole toward the front end surface, and is separated from the front end surface.

4. The ferrule according to claim 1,
wherein the void portion is provided in at least one of a first region located on one side with respect to the plurality of fiber retaining holes in a third direction intersecting the first direction and the second direction, and a second region located on the other side.

5. The ferrule according to claim 4,
wherein the void portion includes a plurality of first portions provided in the first region, and
the plurality of first portions are aligned with the constant diameter portions of the plurality of fiber retaining holes in the third direction, respectively.

6. The ferrule according to claim 4,
wherein the void portion includes one first portion provided in the first region, and
the first portion has a shape extending along the second direction in a cross section perpendicular to the first direction, and is aligned with the constant diameter portions of the plurality of fiber retaining holes in the third direction.

7. The ferrule according to claim 4,
wherein the void portion includes a plurality of second portions provided in the second region, and
the plurality of second portions are aligned with the constant diameter portions of the plurality of fiber retaining holes in the third direction, respectively.

8. The ferrule according to claim 4,
wherein the void portion includes one second portion provided in the second region, and
the second portion has a shape extending along the second direction in a cross section perpendicular to the first direction, and is aligned with the constant diameter portions of the plurality of fiber retaining holes in the third direction.

9. The ferrule according to claim 1, further comprising:
a pair of guide holes provided at positions at which the plurality of fiber retaining holes are interposed between the guide holes in the second direction,
wherein the void portion is provided in at least one of a third region between the plurality of fiber retaining holes and one guide hole and a fourth region between the plurality of fiber retaining holes and the other guide hole.

10. The ferrule according to claim 1,
wherein the minimum value of the width in the plane of the void portion is smaller than the inner diameter of the constant diameter portion.

11. The ferrule according to claim 1,
wherein the minimum value of the width in the plane of the void portion is larger than the inner diameter of the constant diameter portion.

12. The ferrule according to claim 1,
wherein a minimum value of a width in the plane of a hole forming the void portion is 0.4 mm or less.

13. The ferrule according to claim 1,
wherein a separation distance between a hole forming the void portion and the plurality of fiber retaining holes is 0.2 mm or more and 0.5 mm or less.

14. An optical connector comprising:
the ferrule according to claim 1; and
a plurality of optical fibers that are retained by the plurality of fiber retaining holes, respectively.

* * * * *